Feb. 27, 1940.  W. H. FARNSWORTH ET AL  2,191,561
RECOVERY OF USABLE VALUES FROM BRINES
Filed Feb. 11, 1938
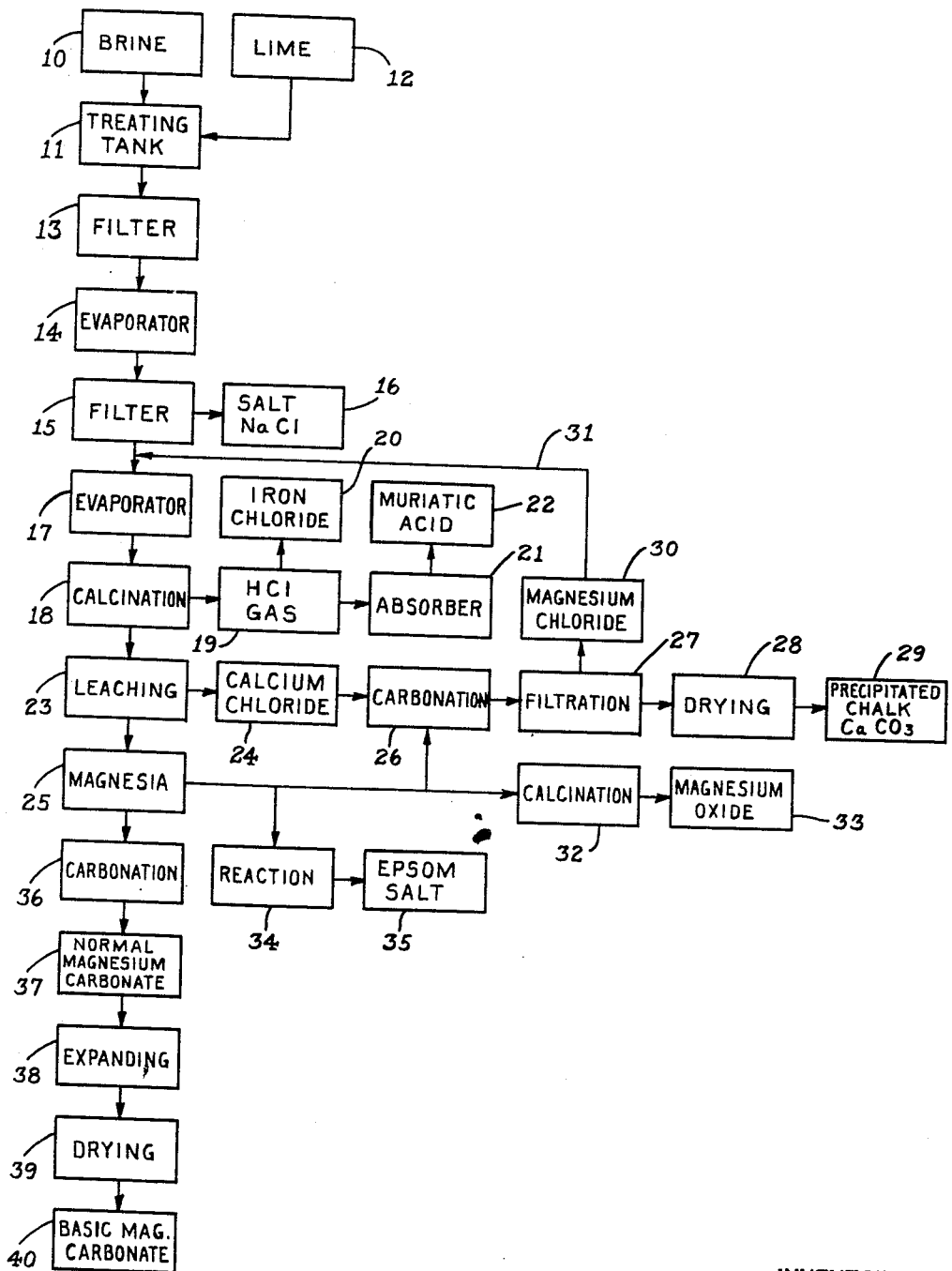
INVENTORS
William H. Farnsworth
BY Clair H. Martin
ATTORNEYS Patented Feb. 27, 1940

2,191,561

UNITED STATES PATENT OFFICE 2,191,561

RECOVERY OF USABLE VALUES FROM BRINES

William H. Farnsworth and Clair H. Martin, Manistee, Mich., assignors to Morton Salt Company, Chicago, Ill., a corporation of Illinois Application February 11, 1938, Serial No. 189,952

6 Claims. (Cl. 23—155)

This invention relates to the treatment of brines for the recovery of the usable values therein.

It is the principal object of the invention to provide a process for recovering efficiently and economically the usable values contained in a naturally occurring brine and to make such values available in separated and substantially pure and concentrated form.

It is a further object to provide a process for treating an inland brine containing sodium, calsium, and magnesium compounds to secure separation and recovery of each of such values in form available for use.

It is also an object to provide for treating a spent brine containing usable values, such as compounds of the alkali metals and alkaline earths under controlled conditions to secure segregation of the various constituents of the brine and the separate recovery thereof in conditions of purity and concentration such as to be available for use.

It is a further object to provide a process for the separation and recovery of the usable values from a brine containing calcium and magnesium halides in which the halides are subjected to a controlled processing such as to be available for calcination in hydrated form with resultant formation of a halogen acid in high strength and substantially undiluted.

It is a still further object to provide a calcination process for the recovery of hydrochloric acid of high purity and of a commercially acceptable grade of concentration from a mixture of calcium and magnesium chlorides in which the chlorides containing water of hydration are subjected to a controlled calcination operation in the absence of additional air or water vapor, the physically associated water of hydration being released during the operation immediately at the seat of reaction to form hydrochloric acid gas.

Other objects and advantages will be apparent from the following description, the accompanying drawing, and the appended claims.

In the drawing the single figure is a diagrammatic view containing a typical flow sheet representative of the practicing of the present invention.

The present invention is particularly applicable to the processing of so-called inland brines which as available usually contain substantial quantities of halides of the alkali metals and alkaline earths in solution therein. The brines are generally of high concentration, and rich in the above described salts. A suitable brine for use in the practicing of the present invention is an inland brine such as obtained from wells at Manistee, Michigan, and from which initially contained bromides have been removed. A satisfactory processing for the removal of such bromides and for the production of bromates therefrom is disclosed in the copending application of Clair H. Martin and Elbert C. Hardy, Serial No. 129,871, filed March 9, 1937, and assigned to the same assignee as this application.

The brine following the removal therefrom of the bromides as above described has a typical analysis such as follows:

| | Per cent by weight |
|---|---|
| Fe | 0.001 |
| Ca | 4.990 |
| Mg | 2.200 |
| K | 0.320 |
| Na | 2.010 |
| Br | 0.010 |
| Cl | 18.680 |
| SO$_4$ | 0.006 |
| Free Cl | 0.0005 |
| | 28.2175 | with a specific gravity at 20° C. of 1.261.

The brine is thus essentially a mixture of sodium, calcium, and magnesium chlorides, comprising a mixture of such salts in solution of high concentration.

In the practicing of the present invention which will be described with reference to the treating of a brine of the general character referred to, it is desired to first effect removal of any iron which is present, and the presence of which may be accounted for by the passage of the brine through tubing and the like. For this purpose, and referring to the flow sheet, the brine at 10 is fed to a treating tank 11 into which lime hydrate is supplied from the source of lime 12. Only a small quantity of lime is utilized, sufficient to react with and precipitate any small quantities of iron that are present. The brine with such precipitate in suspension is supplied to a filter 13 of suitable commercial type such as a gravity sand filter, in which the precipitated iron compounds are removed, and a clear filtered brine discharged.

The clear brine is then passed to an evaporator 14 for the purpose of concentration of the brine, to effect crystallization and consequent segregation of the sodium chloride present in the brine. This is effected by the application of suitably controlled conditions of temperature and pressure, controlled to effect the desired selective crystallization of sodium chloride while retaining the calcium and magnesium chlorides in solution, and while likewise avoiding objectionable change in the characteristics of such calcium and magnesium chlorides. If this operation is carried out at atmospheric pressure, it is found that the solution must be concentrated until it has a boiling point of about 130° C. in order to effect removal of the sodium chloride. It is possible to effect removal of sodium chloride from the solution when concentrated to a range of different boiling points corresponding to a range of pressure conditions, and when separated in crystallized form, the sodium chloride may be readily recovered from the remainder of the hot solution. In the practicing of the present invention it has been found desirable to carry out this action under such suitably controlled conditions as to limit the temperature to which the solution must be heated in order to effect such selective crystallization. Thus it has been found that where the solution is heated above a predetermined temperature condition, chemical and physical changes take place in the calcium and magnesium chlorides remaining in solution which are objectionable from the standpoint of this invention. And accordingly the present invention provides for effecting the evaporation under such suitably controlled conditions as to maintain the calcium and magnesium chlorides in predetermined condition throughout the stage of evaporation.

When magnesium chloride is heated above a predetermined temperature, it tends to break down, with the evolution of hydrochloric acid gas. This is undesirable during the stage of evaporation incident to separation of the sodium chloride constituent of the brine since it results in loss of gas, and accordingly it is desirable to so limit the temperature condition to which the solution is subjected at this stage of the process as to restrict and preferably prevent this breaking down in the magnesium chloride. For this reason it is preferable in the carrying out of the process of the present invention to avoid subjecting the solution to temperatures such as 130° C., necessary to be utilized at atmospheric pressure, in order to effect the selective crystallization of sodium chloride. Preferably therefore the evaporation is carried out under conditions of reduced pressure, such as to effect the desired crystallization under lower temperature conditions, and at such a range that no objectionable breaking down of magnesium chloride occurs.

It is found that the desired results are secured where the solution is concentrated or evaporated under a controlled subatmospheric condition, for example utilizing a vacuum of the order of 19 inches of mercury, and concentrating to a boiling point of the solution of the order of 103° C. Under such condition it is found that the sodium chloride effectively separates in crystal form, leaving the calcium and magnesium chlorides in solution, this temperature condition being such that substantially no breakdown or decomposition of magnesium chloride has occurred. Different temperature-pressure conditions may be utilized in this evaporation step, the conditions given being illustrative of those with which satisfactory results have been secured in practical operations.

The solution at this stage is still quite fluent, and the suspended salt crystals are removed from the hot solution by filter 15, the salt being collected as shown at 16. It may be washed free of adhering liquor quite readily, thus furnishing a separated salt product of high purity.

The filtrate which comprises a mixture of calcium and magnesium chlorides in aqueous solution is then subjected to further evaporation as shown at 17 to remove moisture therefrom and to prepare the liquor for calcination. The solution at this stage corresponds generally to magnesium chloride hexahydrate and calcium chloride dihydrate. As in the previous evaporation step, if the liquor is boiled at atmospheric pressure to drive off water vapor, it is found that the temperature to which it must be carried is within that range which results in objectionable decomposition taking place in the magnesium chloride. Thus it is desired to keep the temperature below about 150° C., and preferably below about 130°, and in order to secure proper evaporation at such lower temperatures it is necessary to reduce the pressure below atmospheric. It is desired to make the magnesium and calcium chlorides available for the calcination reaction in a form associated with water of hydration, and by carrying out the evaporation of the liquor at this stage under predetermined controlled temperature and pressure conditions, the desired evaporating effect is secured, the decomposition of magnesium chloride is avoided, and a proper controlled quantity of water of hydration remains in association with the salts. Very satisfactory results have been secured where the operation was carried out at a temperature of 113° C. and a subatmospheric pressure of the order of 25 inches of mercury. Under such condition, the liquor was converted into a thick viscous mass, the salts being in the form corresponding generally to magnesium chloride tetrahydrate and calcium chloride dihydrate. While not desiring to limit the invention, it is preferred to carry out this stage of the evaporation under conditions of this order and to secure an evaporated liquor of the general character described. The temperature and pressure conditions need not be precisely as thus indicated, but higher or even lower temperatures and pressures may be utilized with satisfactory results. Likewise the number of molecules of water associated with the chlorides may vary, it being desired merely to retain a sufficient quantity of such water in association with at least one of the chlorides to be available for reaction in the subsequent process as will be described hereinafter.

Following the evaporation, the concentrated solution, containing primarily calcium and magnesium chlorides, is discharged either directly to a calcination furnace 18, or to suitable receptacles in which it may be permitted to solidify, to be subsequently subdivided by grinding or the like, and fed to the calcination furnace.

This furnace may be either a stationary or rotary type, and is constructed of acid resisting material capable of withstanding the action of heated hydrochloric acid gas. A temperature is maintained during the calcination reaction of approximately 700–850° C. in order to effect decomposition of magnesium chloride. The furnace may be of sealed construction, since it does not require the addition of either steam or air and the operation is preferably so carried out that access of any material which might act as a diluent or impurity in the reaction products is avoided. The mass is suitably agitated during calcination. Under the action of the heat, the magnesium chloride decomposes, and simultaneously therewith, the water of hydration present in association with the chlorides, is driven off, and made available, directly at the seat of reaction. The reaction results in the formation of hydrochloric acid gas either directly or with an intermediate reaction, and leaving a solid phase containing calcium chloride and magnesium oxide. The water of hydration is found to be made available at substantially the same temperature range conditions under which the chemical decomposition of the magnesium chloride takes place, and being thus present directly in the reacting zone, immediate reaction occurs with the resultant production of hydrochloric acid gas. As the temperature of the mass continues to rise during the processing, the magnesium chloride is continuously decomposed until substantially complete conversion thereof has taken place, the water of hydration being progressively made available as decomposition occurs, so that a highly effective and substantially complete reaction of the chlorine atom takes place, forming a concentrated hydrochloric acid gas. The conditions during evaporation are controlled to retain sufficient water present in association with at least one of the chlorides which may be made available for reaction during calcination, some excess beyond that theoretically required being preferable to assure completion of the reaction but not such large excess as to be an objectionable diluent for the formed hydrochloric acid gas. Since no additional material is added, in the form of steam, air, or otherwise, the formed hydrochloric acid gas is substantially free of diluting materials, and is thus made available in highly concentrated form. In actual operations, a complete decomposition has been secured with a calcination period varying from approximately forty minutes to two hours, depending upon the physical handling of the mass during the calcination operation.

The hydrochloric acid gas driven off during the calcination action is shown at 19, and may be reacted with iron or iron ore (iron oxide) to produce ferrous or ferric chloride as shown at 20, if that is desired. Alternatively it may be absorbed in water as shown at 21, forming a suitably concentrated source of muriatic acid of commerce as shown at 22. Thus there has in actual operation been successfully produced by this processing a hydrochloric acid of 20° Baumé, representing a commercial grade of acid as thus initially produced.

The product remaining in the calcination furnace is a mixture essentially of a soluble calcium chloride and an insoluble phase consisting of magnesium oxide. In order to separate these materials, the residue from the calcination furnace is leached as shown at 23, preferably in a counter flow extraction system, to provide a concentrated solution of calcium chloride 24, leaving the insoluble magnesia at 25, as a mixture of insoluble magnesium oxide and hydroxide. At this stage of the processing there has thus been effected a complete segregation of the several chlorides initially present in the brine, each such chloride being recovered separately, substantially free of impurities, in a condition of high concentration, and available directly for use as such. The separated constituents may be further processed to produce suitable reaction products as desired. The calcium chloride may be subjected to carbonation in the presence of an equal molar quantity of magnesium hydroxide supplied from 25, as shown at 26, with the production of a calcium carbonate precipitate. The precipitate is filtered at 27 from the remaining liquor, the precipitate being dried at 28, and thus made available as precipitated chalk as shown at 29. This reaction also serves to recover the chloride ion, the filtrate, which contains the soluble magnesium chloride, being collected as shown at 30 for use as such, or returned to the evaporator by return line 31, to thereby provide for complete recovery of all magnesium chlorides.

The separated magnesia 25 may be subjected to additional calcination as shown at 32 for the complete conversion thereof to magnesium oxide 33. Or the magnesia may be subjected to a suitable reaction such as shown at 34, for the production of Epsom salts 35. A suitable reaction for this purpose, and providing for the effective and efficient formation of Epsom salts is disclosed in applicants' copending application Ser. No. 165,722 filed September 25, 1937 and assigned to the same assignee as this application.

Or alternatively the magnesia may be subjected to a carbonation action 36, to form normal magnesium carbonate 37. Where a basic magnesium carbonate is desired, the normal carbonate so formed is subjected to an expanding action 38, and the product then dried at 39, to provide the basic magnesium carbonate 40. A suitable process for producing such basic magnesium carbonate is described in applicants' copending application Serial No. 171,706, filed October 29, 1937 and assigned to the same assignee as this application.

The present invention therefore provides a highly satisfactory, simple, and economical treatment for the segregation and recovery of usable values from a waste brine. Each constituent is separately recovered, in substantially pure and concentrated form, such that it is directly available for use as such, or for the utilization in additional processing to form reaction products. The process is highly economical, does not require the use of reagents, and involves only the utilization of heat, under suitable controlled conditions to secure the results desired. Thus the resulting products are secured in substantially concentrated form, and free of impurities where initially present, or which might be introduced through the use of reagents.

While the process herein described constitutes the preferred embodiment of the invention, it is to be understood that the invention is not limited to this precise process, and that changes may be made therein without departing from the scope of the invention which is defined in the appended claims.

What is claimed is:

1. A process for the recovery of usable values from brines containing chlorides of sodium, magnesium and calcium; which comprises heating the brine to a concentration temperature of approximately 130° C., sufficiently to concentrate said brine to precipitate the sodium chloride with negligible driving off of hydrogen chloride, separating the precipitated sodium chloride, heating the resultant solution of magnesium and calcium chlorides under controlled evaporation conditions of limited temperature of approximately not to exceed 150° C. sufficiently to evaporate off a major portion of the water and leaving a minimum quantity of four molecules of water of hydration associated with said magnesium chloride, and thereafter heating the admixture as produced to a temperature of the order of 700° C. to cause the water of hydration to react with said magnesium chloride to form magnesium oxide and evolve hydrochloric acid with unreacted water of hydration.

2. A process for the recovery of usable values from brines containing chlorides of sodium, magnesium and calcium; which comprises heating the brine to a concentration temperature of approximately 130° C. sufficiently to concentrate said brine to precipitate the sodium chloride with negligible driving off of hydrogen chloride, separating the precipitated sodium chloride, heating the resultant solution of magnesium and calcium chlorides under controlled evaporation conditions of limited temperature and absolute pressure of approximately 130° C. and not to exceed twenty-five inches of mercury sufficiently to concentrate said solution to produce a viscous thick mixture comprising hydrated magnesium and calcium chlorides, and thereafter heating the admixture as produced to a temperature of the order of 700° C. to cause the water of hydration to react with said magnesium chloride to form magnesium oxide and evolve hydrochloric acid with unreacted water of hydration.

3. A process for the recovery of usable values from brines containing chlorides of sodium, magnesium and calcium; which comprises heating the brine under controlled evaporation conditions of limited temperature and absolute pressure of approximately 103° C. and nineteen inches of mercury sufficiently to concentrate said brine to precipitate the sodium chloride with negligible driving off of hydrogen chloride, separating the precipitated sodium chloride, heating the resultant solution of magnesium and calcium chlorides under controlled evaporation conditions of limited temperature of approximately not to exceed 150° C. sufficiently to concentrate said solution to produce a viscous thick mixture comprising hydrated magnesium and calcium chlorides, and thereafter heating the admixture as produced to a temperature of the order of 700° C. to cause the water of hydration to react with said magnesium chloride to form magnesium oxide and evolve hydrochloric acid with unreacted water of hydration.

4. A process for the recovery of usable values from brines containing chlorides of sodium, magnesium and calcium; which comprises heating the brine under controlled evaporation conditions of limited temperature and absolute pressure of approximately 103° C. and nineteen inches of mercury sufficiently to concentrate said brine to precipitate the sodium chloride with negligible driving off of hydrogen chloride, separating the precipitated sodium chloride, heating the resultant solution of magnesium and calcium chlorides under controlled evaporation conditions of limited temperature and absolute pressure of approximately 130° C. and not to exceed twenty-five inches of mercury sufficiently to concentrate said solution to produce a viscous thick mixture comprising hydrated magnesium and calcium chlorides, and thereafter heating the admixture as produced to a temperature of the order of 700° C. to cause the water of hydration to react with said magnesium chloride to form magnesium oxide and evolve hydrochloric acid with unreacted water of hydration.

5. A process for the recovery of usable values from solutions containing chlorides of magnesium and calcium; which comprises heating said solution under controlled evaporation conditions of limited temperature and absolute pressure of the order of approximately not to exceed 150° C. and nineteen inches of mercury sufficiently to concentrate said solution to produce a viscous thick mixture comprising hydrated magnesium and calcium chlorides, and thereafter heating the admixture as produced to a temperature of the order of 700° C. to cause the water of hydration to react with said magnesium chloride to form magnesium oxide and evolve hydrochloric acid with unreacted water of hydration.

6. A process for the recovery of usable values from brines containing chlorides of sodium, magnesium and calcium; which comprises heating the brine under controlled evaporation conditions of limited temperature and absolute pressure of approximately 103° C. and nineteen inches of mercury sufficiently to concentrate said brine to precipitate the sodium chloride with negligible driving off of hydrogen chloride, separating the precipitated sodium chloride, heating the resultant solution of magnesium and calcium chlorides under controlled evaporation conditions of limited temperature and absolute pressure of approximately 113° C. and twenty-five inches of mercury sufficiently to concentrate said solution to produce a viscous thick mixture comprising hydrated magnesium and calcium chlorides, and thereafter heating the admixture as produced to a temperature of the order of 700° C. to cause the water of hydration to react with said magnesium chloride to form magnesium oxide and evolve hydrochloric acid with unreacted water of hydration.

WILLIAM H. FARNSWORTH.
CLAIR H. MARTIN.